United States Patent
Dahiya et al.

(10) Patent No.: US 11,328,066 B2
(45) Date of Patent: May 10, 2022

(54) METHOD AND SYSTEM FOR SECURELY PATCHING READ-ONLY-MEMORY CODE

(71) Applicant: NXP USA, Inc., Austin, TX (US)

(72) Inventors: Atul Dahiya, Gurgaon (IN); Sandeep Jain, Noida (IN)

(73) Assignee: NXP USA, INC., Austin, TX (US)

( * ) Notice: Subject to any disclaimer, the term of this patent is extended or adjusted under 35 U.S.C. 154(b) by 231 days.

(21) Appl. No.: 16/843,633

(22) Filed: Apr. 8, 2020

(65) Prior Publication Data

US 2021/0319107 A1 Oct. 14, 2021

(51) Int. Cl.
| | |
|---|---|
| *G06F 21/57* | (2013.01) |
| *G06F 12/06* | (2006.01) |
| *G06F 8/65* | (2018.01) |
| *G06F 21/60* | (2013.01) |
| *H04L 9/32* | (2006.01) |

(52) U.S. Cl.
CPC .............. *G06F 21/572* (2013.01); *G06F 8/66* (2013.01); *G06F 12/0646* (2013.01); *G06F 21/602* (2013.01); *H04L 9/32* (2013.01); *G06F 2212/2142* (2013.01); *G06F 2221/033* (2013.01)

(58) Field of Classification Search
CPC ...... G06F 8/66; G06F 12/0646; G06F 51/572; G06F 21/602; G06F 2212/2142; G06F 2221/033; H04L 9/32
See application file for complete search history.

(56) References Cited

U.S. PATENT DOCUMENTS

| | | | |
|---|---|---|---|
| 7,805,719 B2* | 9/2010 | O'Neill | G06F 8/65 |
| | | | 717/168 |
| 9,471,785 B2 | 10/2016 | Zaidi et al. | |
| 9,547,489 B2* | 1/2017 | Pirvu | G06F 21/575 |
| 9,756,146 B2* | 9/2017 | Athalye | H04L 9/3239 |
| 11,138,295 B2* | 10/2021 | Tsao | G06F 8/65 |
| 2007/0083713 A1* | 4/2007 | Torrini | G06F 9/328 |
| | | | 711/125 |
| 2007/0169099 A1* | 7/2007 | Rao | G06F 8/65 |
| | | | 717/168 |
| 2009/0271593 A1* | 10/2009 | Hsu | G06F 8/66 |
| | | | 712/226 |
| 2010/0115202 A1* | 5/2010 | Zimmer | G06F 12/126 |
| | | | 711/118 |
| 2010/0180104 A1* | 7/2010 | Henry | G06F 9/32 |
| | | | 712/208 |
| 2011/0107070 A1* | 5/2011 | Barbulescu | G06F 9/3017 |
| | | | 712/226 |

(Continued)

*Primary Examiner* — Douglas M Slachta (57) ABSTRACT

A secure read-only-memory (ROM) code patching system includes a processor that is configured to generate first partial cryptographic data based on a ROM patch and a set of secret bits, and authenticate the ROM patch based on a match between the first partial cryptographic data and reference partial cryptographic data of the ROM patch. Upon the authentication of the ROM patch, the processor is further configured to generate an address associated with a set of ROM instructions of a ROM code. Based on a match between the generated address and a ROM patch address of the ROM patch, the processor is further configured to execute a set of patch instructions of the ROM patch that is successfully authenticated instead of the set of ROM instructions, thereby securely patching the ROM code.

20 Claims, 5 Drawing Sheets

(56) References Cited

U.S. PATENT DOCUMENTS

2014/0164789 A1* 6/2014 Kaplan ................ G06F 21/572
713/191
2017/0090909 A1* 3/2017 Guo ........................ G06F 21/57
2020/0348939 A1* 11/2020 Ghetie ............... G06F 9/30145

* cited by examiner

METHOD AND SYSTEM FOR SECURELY PATCHING READ-ONLY-MEMORY CODE

BACKGROUND

The present disclosure relates generally to electronic circuits, and, more particularly, to a method and a system for securely patching a read-only-memory (ROM) code.

In system-on-chips (SoCs), ROM codes are typically stored in ROMs and include ROM instructions that are utilized for executing various operations (such as boot operations) of the SoCs. A ROM code is stored before a tape-out of an SoC, and is unalterable. As a result, after the tape-out, if a bug is identified in the ROM code, a new tape-out is required. To solve the aforementioned problem, a ROM patch is typically stored in a one-time programmable (OTP) memory of the SoC after the tape-out and prior to the deployment of the SoC in the field, i.e., for its designated application. The ROM patch includes bits corresponding to an address of the ROM patch, and ROM patch instructions that need to be patched to the ROM code. When the address of the ROM patch matches a memory address associated with erroneous ROM instructions (i.e., the ROM instructions having a bug), the ROM patch instructions are executed instead of the erroneous ROM instructions. The ROM patch thus fixes the bug in the ROM code.

The aforementioned technique of patching the ROM code, however, has shortcomings of its own. The patch instructions stored in the OTP memory may be malicious. As the ROM code may be a first piece of code that is executed on the SoC, execution of the malicious patch instructions compromises the security of the SoC and in turn of a device in which the SoC is included. Further, once the SoC is deployed in the field, the storage of additional ROM patches is non-viable as it may compromise the security of the SoC and the device. Thus, if the bug is identified after the device (i.e., the SoC) is deployed, the device has to remain in the field with the bug or has to be replaced, thereby leading to a significant risk in the operation of the device and/or a significant increase in a cost of manufacturing of the device. Therefore, there exists a need for a system and a method that solves the aforementioned problems of the existing technique of patching the ROM code.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

In one embodiment, a system for securely patching a read-only-memory (ROM) code is provided. The system includes a processor that is configured to generate first partial cryptographic data based on a ROM patch and a set of secret bits. The ROM patch includes a set of address bits, a set of reference bits, and a set of data bits that are indicative of a ROM patch address, reference partial cryptographic data, and a set of patch instructions, respectively. The processor is further configured to authenticate the ROM patch based on a match between the first partial cryptographic data and the reference partial cryptographic data. Upon the authentication of the ROM patch, the processor is further configured to generate a first address that is associated with a first set of ROM instructions of a plurality of ROM instructions of the ROM code. Further, when the first address matches the ROM patch address, the processor is configured to execute the set of patch instructions of the ROM patch that is successfully authenticated instead of the first set of ROM instructions, thereby securely patching the ROM code.

In another embodiment, a method for securely patching a read-only-memory (ROM) code stored in a ROM of a system-on-chip (SoC) by a processor of the SoC is provided. The method includes generating first partial cryptographic data based on a ROM patch and a set of secret bits. The ROM patch includes a set of address bits, a set of reference bits, and a set of data bits that are indicative of a ROM patch address, reference partial cryptographic data, and a set of patch instructions, respectively. The method further includes authenticating the ROM patch based on a match between the first partial cryptographic data and the reference partial cryptographic data. The method further includes generating, upon the authentication of the ROM patch, a first address that is associated with a first set of ROM instructions of a plurality of ROM instructions of the ROM code. Further, the method includes executing, when the first address matches the ROM patch address, the set of patch instructions of the ROM patch that is successfully authenticated instead of the first set of ROM instructions, thereby securely patching the ROM code.

Various embodiments of the present disclosure provide a method and a system for securely patching a read-only-memory (ROM) code. The system includes a processor that is configured to generate first partial cryptographic data based on a ROM patch and a set of secret bits, and authenticate the ROM patch based on a match between the first partial cryptographic data and reference partial cryptographic data associated with the ROM patch. The processor is further configured to generate, upon the authentication of the ROM patch, an address that is associated with a set of ROM instructions of the ROM code. When the generated address matches a ROM patch address associated with the ROM patch, the processor is further configured to execute a set of patch instructions associated with the ROM patch that is successfully authenticated instead of the set of ROM instructions, thereby securely patching the ROM code.

As the ROM patch is authenticated prior to the patching of the ROM code, a security of the system (i.e., a system-on-chip (SoC)) and a device in which the SoC is included remains uncompromised. Further, the secure patching of the ROM code ensures that if a bug is identified in the ROM code after the device is deployed in the field, the corresponding ROM patch for fixing the bug may be stored in the SoC while the device is in the field. Thus, a need for replacing the device to fix the bug is eliminated, thereby leading to a low cost of manufacturing of the device. Further, as the bug is fixed while the device is in the field, the device including the SoC of the present disclosure operates more efficiently as compared to devices in which conventional ROM code patching techniques are implemented. Thus, the ROM code patching technique of the present disclosure is more secure as compared to the conventional ROM code patching techniques.

Figure 1:
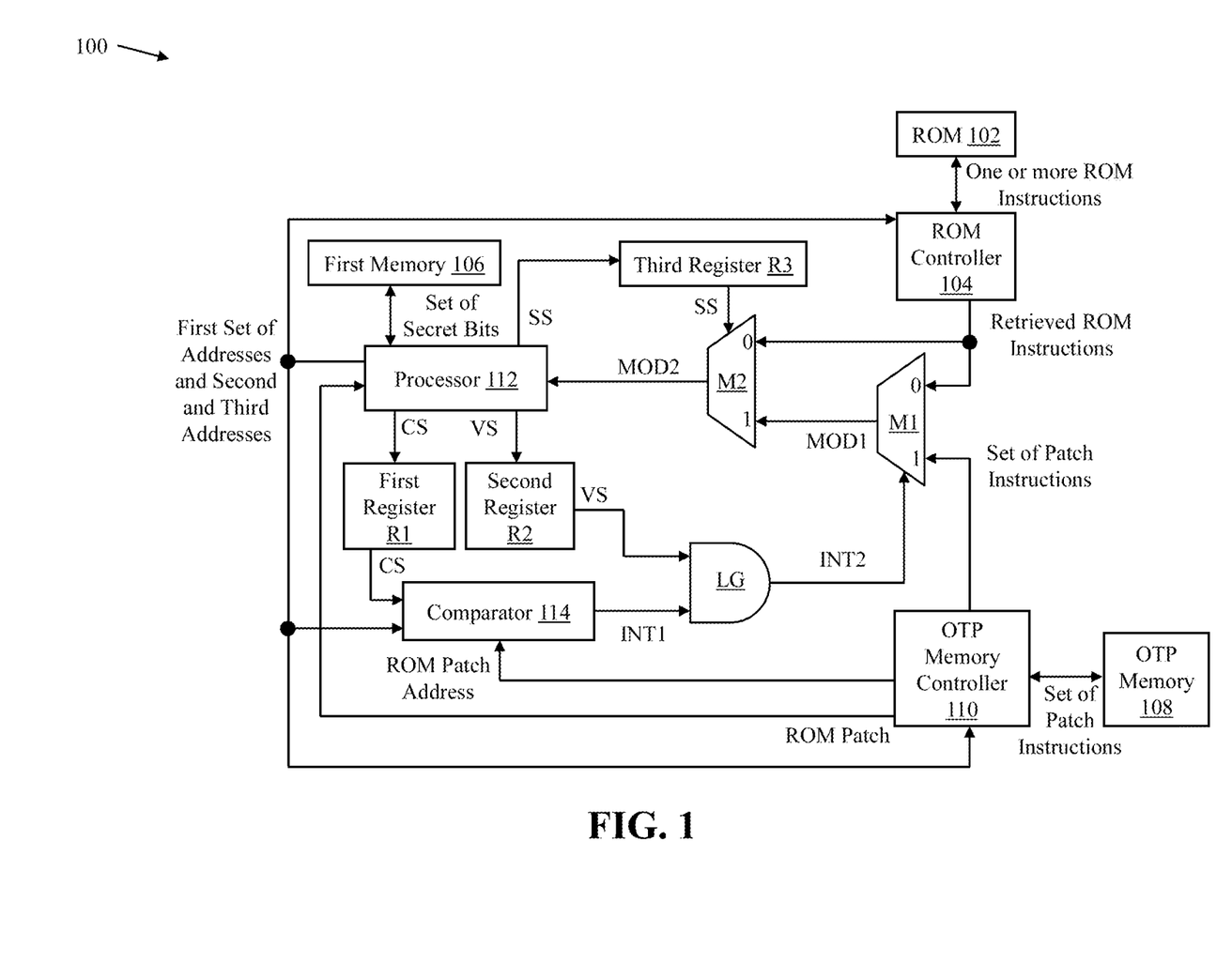
FIG. 1 illustrates a schematic block diagram of a system-on-chip (SoC) in accordance with an embodiment of the present disclosure.

FIG. 1 illustrates a schematic block diagram of a system-on-chip (SoC) 100 in accordance with an embodiment of the present disclosure. The SoC 100 corresponds to a system that is configured to securely patch a read-only-memory (ROM) code by utilizing a ROM patch. The SoC 100 includes a ROM 102, a ROM controller 104 that is coupled with the ROM 102, a first memory 106, a one-time programmable (OTP) memory 108, and an OTP memory controller 110 that is coupled with the OTP memory 108. The SoC 100 further includes a processor 112, a comparator 114, first through third registers R1-R3, a logic gate LG, and first and second multiplexers (MUXs) M1 and M2. The SoC 100 may be included in various devices such as automotive devices, mobile devices, network devices, or the like.

The ROM 102 is configured to store the ROM code. The ROM code includes a plurality of ROM instructions that are utilized for executing various operations associated with the SoC 100. In an example, the ROM code corresponds to a boot code that includes a plurality of boot instructions that are utilized for executing various boot operations associated with the SoC 100. The plurality of ROM instructions are stored in the ROM 102 such that each memory address of the ROM 102 (hereinafter referred to as "address") is associated with at least one ROM instruction of the plurality of ROM instructions.

The ROM controller 104 is coupled with the ROM 102, and is configured to control memory access operations (e.g., read or retrieve operations) associated with the ROM 102. Further, the ROM controller 104 is coupled with the processor 112, and is configured to receive various addresses that are generated by the processor 112, and retrieve one or more ROM instructions of the plurality of ROM instructions from the ROM 102 based on each received address. The ROM controller 104 is further coupled with the first and second MUXs M1 and M2, and is further configured to provide the retrieved ROM instructions to the first and second MUXs M1 and M2.

The first memory 106 is configured to store a set of secret bits that is utilized for authenticating the ROM patch prior to utilizing the ROM patch for patching the ROM code. In an embodiment, the set of secret bits is stored in the first memory 106 by a system controller (not shown) that is external to the SoC 100. The set of secret bits may be stored in the first memory 106 prior to or during a tape-out of the SoC 100.

The OTP memory 108 is configured to store the ROM patch that is utilized for patching the ROM code. In an embodiment, the ROM patch is stored in the OTP memory 108 by the system controller. The ROM patch is utilized to fix a bug that is identified in the ROM code. In other words, the ROM patch is utilized to prevent undesirable effects on an operation of the SoC 100 as a result of execution of ROM instructions having the bug. The ROM instructions having the bug are hereinafter referred to as "erroneous ROM instructions". For the sake of ongoing discussion and without deviating from the scope of the present disclosure, it is assumed that the erroneous ROM instructions are associated with a single address (i.e., a single memory address of the ROM 102). The ROM patch is stored in the OTP memory 108 after the tape-out of the SoC 100. Further, upon storing of the ROM patch in the OTP memory 108, the SoC 100 and a device (not shown) in which the SoC 100 is included are deployed in the field, i.e., for its designated application. The ROM patch includes a ROM patch enable bit, a set of address bits, a set of data bits, a set of reference bits, and a lock bit.

The ROM patch enable bit is a fuse bit that indicates whether the ROM patch is active or inactive. In an example, a logic high state of the ROM patch enable bit indicates that the ROM patch is active and may be utilized for patching the ROM code. Conversely, a logic low state of the ROM patch enable bit indicates that the ROM patch is inactive and may not be utilized for patching the ROM code. The lock bit is a fuse bit that controls access to the ROM patch. In an example, a logic high state of the lock bit ensures that the ROM patch is locked and remains unaltered. Conversely, a logic low state of the lock bit indicates that the ROM patch is unlocked and may not be utilized for patching the ROM code.

The set of address bits is indicative of a ROM patch address that corresponds to an address associated with the erroneous ROM instructions. The set of data bits is indicative of a set of patch instructions that is associated with the ROM patch address. The set of patch instructions corresponds to instructions that are to be patched to the ROM code (i.e., the instructions that are to be executed instead of the erroneous ROM instructions).

The set of reference bits is indicative of reference partial cryptographic data associated with the ROM patch. The reference partial cryptographic data is utilized for authenticating the ROM patch. The reference partial cryptographic data is generated, prior to the storage of the ROM patch in the OTP memory 108, based on the ROM patch enable bit, the set of address bits, the set of data bits, and the set of secret bits. In an embodiment, the reference partial cryptographic data is generated by the system controller. To generate the reference partial cryptographic data, the ROM patch enable bit, the set of address bits, and the set of data bits are collated to generate reference collated data. The set of secret bits is appended to the reference collated data to generate reference appended data, and a first cryptographic operation is executed on the reference appended data to generate reference cryptographic data. In an embodiment, the first cryptographic operation corresponds to a Secure Hash Algorithm 256 (SHA-256) operation. The reference cryptographic data thus corresponds to reference hash data having 256 data bits. A first trim operation may then be executed on the reference cryptographic data to trim the reference cryptographic data and generate the reference partial cryptographic data. In an example, lower 32 bits of the 256-bit reference cryptographic data correspond to the reference partial cryptographic data.

The OTP memory controller 110 is coupled with the OTP memory 108, and is configured to control memory access operations (e.g., read or retrieve operations) associated with the OTP memory 108. Further, the OTP memory controller 110 is coupled with the processor 112, and is configured to receive the addresses that are generated by the processor 112, and compare each received address with the ROM patch address. Based on a result of the comparison, the OTP memory controller 110 is further configured to retrieve the set of patch instructions from the OTP memory 108. In an example, the OTP memory controller 110 retrieves the set of patch instructions from the OTP memory 108 when one of the received addresses matches the ROM patch address. The OTP memory controller 110 is further coupled with the first MUX M1, and is further configured to provide the set of patch instructions to the first MUX M1.

The processor 112 is coupled with the ROM controller 104, the OTP memory controller 110, the first memory 106, the first through third registers R1-R3, the comparator 114, and the second MUX M2. Additionally, the processor 112 is coupled with the ROM 102 and the OTP memory 108 by way of the ROM controller 104 and the OTP memory controller 110, respectively. The processor 112 is configured to retrieve the set of secret bits stored in the first memory 106. The first memory 106 is accessible to the processor 112 exclusively during the authentication of the ROM patch. Although FIG. 1 illustrates that the first memory 106 is external to the processor 112, the scope of the present disclosure is not limited to it. In various other embodiments, the first memory 106 may be internal to the processor 112, without deviating from the scope of the present disclosure.

The processor 112 is configured to generate the addresses that are associated with various ROM instructions of the plurality of ROM instructions. The addresses are generated sequentially in accordance with a program counter (not shown) associated with the processor 112. The processor 112 is further configured to communicate each generated address to the comparator 114, the ROM controller 104, and the OTP memory controller 110. For example, the processor 112 is configured to generate a first set of addresses that is associated with a first set of ROM instructions of the plurality of ROM instructions. The processor 112 is further configured to receive and execute the first set of ROM instructions.

The first set of addresses may be generated upon a power-up of the SoC 100. For the sake of ongoing discussion, it is assumed that the first set of addresses (and the corresponding first set of ROM instructions) is associated with the authentication of the ROM patch, and hence is unavailable for patching. In other words, each address of the first set of addresses is different than the ROM patch address. Further, by executing first and second subsets of ROM instructions of the first set of ROM instructions, the processor 112 is configured to generate first partial cryptographic data and authenticate the ROM patch, respectively. The first partial cryptographic data is generated based on the ROM patch and the set of secret bits, and the ROM patch is authenticated based on a match between the first partial cryptographic data and the reference partial cryptographic data.

To generate the first partial cryptographic data, the processor 112 is further configured to retrieve the ROM patch from the OTP memory 108, by way of the OTP memory controller 110. The processor 112 is further configured to generate first collated data by collating the ROM patch enable bit, the set of address bits, and the set of data bits, and generate first appended data by appending the set of secret bits to the first collated data. Further, the processor 112 is configured to generate first cryptographic data by executing a second cryptographic operation on the first appended data. In an example, the second cryptographic operation corresponds to a SHA-256 operation. Thus, the first cryptographic data may correspond to first hash data having 256 data bits. The processor 112 is further configured to execute a second trim operation on the first cryptographic data to trim the first cryptographic data and generate the first partial cryptographic data. In an example, lower 32 bits of the 256-bit first cryptographic data correspond to the first partial cryptographic data.

The processor 112 is further configured to generate, by executing a third subset of ROM instructions of the first set of ROM instructions, a validity signal VS based on the authentication of the ROM patch. When the authentication of the ROM patch is successful, the validity signal VS is generated at a logic high state, and when the authentication of the ROM patch is unsuccessful, the validity signal VS is generated at a logic low state. Further, the processor 112 is configured to generate, by executing fourth and fifth subsets of ROM instructions of the first set of ROM instructions, a control signal CS and a select signal SS, respectively. The select signal SS and the control signal CS are generated based on the ROM patch enable bit. In an example, when the ROM patch enable bit is at logic high and logic low states, the select signal SS and the control signal CS are generated at logic high and logic low states, respectively. The processor 112 is further configure to provide, by executing a sixth subset of ROM instructions of the first set of ROM instructions, the control signal CS, the validity signal VS, and the select signal SS to the first through third registers R1-R3, respectively.

Although it is described that the processor 112 generates two separate signals (i.e., the control and select signals CS and SS) for providing to the first and third registers R1 and R3, the scope of the present disclosure is not limited to it. In various other embodiments, the processor 112 may generate a single signal, based on the ROM patch enable bit, and provide the same signal to the first and third registers R1 and R3, without deviating from the scope of the present disclosure.

The processor 112 is similarly configured to generate, upon the authentication of the ROM patch, a second address that is associated with a second set of ROM instructions of the plurality of ROM instructions. For the sake of ongoing discussion, it is assumed that the second address is associated with the erroneous ROM instructions of the ROM code (i.e., the second set of ROM instructions corresponds to the erroneous ROM instructions). In one example, the second address is immediately subsequent to the first set of addresses. In another example, various other addresses, associated with the corresponding sets of ROM instructions, may be generated by the processor 112 between the first set of addresses and the second address. As the second address corresponds to the erroneous ROM instructions, the second address and the ROM patch address match. As the second address and the ROM patch address match, the processor 112 is thus configured to receive and execute the set of patch instructions of the ROM patch that is successfully authenticated instead of the second set of ROM instructions. The ROM code is thus securely patched.

The processor 112 may further be configured to generate, upon the execution of the set of patch instructions, a third address that is associated with a third set of ROM instructions of the plurality of ROM instructions. The third address is immediately subsequent to the second address. Further, the processor 112 is configured to receive and execute the third set of ROM instructions to resume the execution of the ROM code. Examples of the processor 112 include an application specific integrated circuit (ASIC) processor, a reduced instruction set computer (RISC) processor, a complex instruction set computer (CISC) processor, or the like.

The first register R1 is coupled with the processor 112 and the comparator 114. The first register R1 is configured to receive the control signal CS and store one or more data bits associated with the control signal CS. The first register R1 is further configured to provide the control signal CS (i.e., the data bits associated with the control signal CS) to the comparator 114.

The comparator 114 is coupled with the processor 112, the OTP memory controller 110, and the first register R1. The comparator 114 is configured to receive the control signal CS. The control signal CS enables the processor 112 to control an operation of the comparator 114. When the control signal CS is at logic high and logic low states, the comparator 114 is operational and non-operational, respectively. When the comparator 114 is operational, the comparator 114 is further configured to receive the addresses generated by the processor 112 (i.e., the second and third addresses) and the ROM patch address of the ROM patch. The comparator 114 is further configured to compare each address received from the processor 112 with the ROM patch address to generate a first intermediate signal INT1. In an example, when the received address matches the ROM patch address, the first intermediate signal INT1 is generated at a logic high state. Conversely, when the received address and the ROM patch address do not match, the first intermediate signal INT1 is generated at a logic low state.

The second register R2 is coupled with the processor 112 and the logic gate LG. The second register R2 is configured to receive the validity signal VS and store one or more data bits associated with the validity signal VS. The second register R2 is further configured to provide the validity signal VS (i.e., the data bits associated with the validity signal VS) to the logic gate LG.

The logic gate LG has first and second input terminals that are coupled with the second register R2 and the comparator 114, respectively. The first and second input terminals of the logic gate LG are configured to receive the validity signal VS and the first intermediate signal INT1, respectively. The logic gate LG further has an output terminal that is configured to output a second intermediate signal INT2 based on the logic states of the validity signal VS and the first intermediate signal INTL. In an example, when the validity signal VS and the first intermediate signal INT1 are at logic high states, the second intermediate signal INT2 is outputted at a logic high state. Further, when one of the validity signal VS or the first intermediate signal INT1 is at a logic low state, the second intermediate signal INT2 is outputted at a logic low state. In an embodiment, the logic gate LG is an AND gate.

The first MUX M1 has a select terminal that is coupled with the output terminal of the logic gate LG, and is configured to receive the second intermediate signal INT2. The first MUX M1 further has first and second input terminals that are coupled with the ROM controller 104 and the OTP memory controller 110, respectively. The first input terminal of the first MUX M1 is configured to receive the ROM instructions retrieved by the ROM controller 104 from the ROM 102 (hereinafter referred to as a "fourth set of ROM instructions"). The fourth set of ROM instructions is included in at least one of the first, second, and third sets of ROM instructions. In other words, when the address generated by the processor 112 is an address of the first set of addresses, the fourth set of ROM instructions may correspond to at least one ROM instruction of the first set of ROM instructions. Similarly, the fourth set of ROM instructions may correspond to the second and third sets of ROM instructions when the address generated by the processor 112 is the second and third addresses, respectively. The second input terminal of the first MUX M1 is similarly configured to receive the set of patch instructions. The second input terminal of the first MUX M1 receives the set of patch instructions when the address generated by the processor 112 (e.g., the second address) matches the ROM patch address. The first MUX M1 further has an output terminal that is configured to output first MUX output data MOD1. When the second intermediate signal INT2 is at logic low and logic high states, the first MUX M1 outputs the fourth set of ROM instructions and the set of patch instructions as the first MUX output data MOD1, respectively.

The third register R3 is coupled with the processor 112 and the second MUX M2. The third register R3 is configured to receive the select signal SS and store one or more data bits associated with the select signal SS. The third register R3 is further configured to provide the select signal SS (i.e., the data bits associated with the select signal SS) to the second MUX M2.

The second MUX M2 has first and second input terminals that are coupled with the ROM controller 104 and the output terminal of the first MUX ML, respectively. The first input terminal of the second MUX M2 is configured to receive the fourth set of ROM instructions that is retrieved by the ROM controller 104 from the ROM 102. Similarly, the second input terminal of the second MUX M2 is configured to receive the first MUX output data MOD1. The second MUX M2 further has a select terminal that is coupled with the third register R3, and an output terminal that is coupled with the processor 112. The second MUX M2 is configured to receive the select signal SS at the select terminal, output at the output terminal second MUX output data MOD2, and provide the second MUX output data MOD2 to the processor 112. When the select signal SS is at logic low and logic high states, the second MUX M2 outputs the fourth set of ROM instructions and the first MUX output data MOD1 as the second MUX output data MOD2, respectively.

In operation, when the SoC 100 is powered up, the processor 112 retrieves the set of secret bits from the first memory 106 and initiates the execution of the ROM code. The processor 112 thus generates the first set of addresses sequentially. The first set of addresses is further sequentially communicated to the ROM controller 104, the OTP memory controller 110, and the comparator 114. For the sake of ongoing discussion, it is assumed that upon the power-up of the SoC 100, the control and select signals CS and SS are at logic low states. As the control signal CS is at a logic low state, the comparator 114 is non-operational. Thus, the ROM controller 104 and the OTP memory controller 110 are configured to receive the first set of addresses. The ROM controller 104 is further configured to retrieve the fourth set of ROM instructions (i.e., at least one ROM instruction of the first set of ROM instructions) from the ROM 102 based on each address of the first set of address. In other words, based on the first set of addresses, the ROM controller 104 is configured to retrieve the first set of ROM instructions. The OTP memory controller 110 is configured to compare each address of the first set of addresses with the ROM patch address. As each address of the first set of addresses is different than the ROM patch address, the set of patch instructions is not retrieved from the OTP memory 108. Further, as the select signal SS is at a logic low state, the second MUX M2 is configured to provide, to the processor 112 for each address of the first set of addresses, the corresponding fourth set of ROM instructions.

The first set of ROM instructions of the ROM code includes instructions to identify whether the ROM patch stored in the OTP memory 108 is active, and authenticate the active ROM patch. The processor 112 determines that the ROM patch is active when the ROM patch enable bit and the lock bit are at logic high states. For the sake of ongoing discussion, it is assumed that the ROM patch enable bit and the lock bit are at logic high states and that the ROM patch is active. Further, the processor 112 authenticates the ROM patch by generating the first partial cryptographic data and comparing the first partial cryptographic data with the reference partial cryptographic data of the ROM patch. To generate the first partial cryptographic data, the processor 112 retrieves the ROM patch from the OTP memory 108. Further, the processor 112 generates the first collated data by collating the ROM patch enable bit, the set of address bits, and the set of data bits. The set of secret bits is then appended to the first collated data to generate the first appended data. The processor 112 further executes the second cryptographic operation on the first appended data to generate the first cryptographic data. Further, the second trim operation is executed on the first cryptographic data to generate the first partial cryptographic data.

The first partial cryptographic data is then compared with the reference partial cryptographic data of the ROM patch. If the first and reference partial cryptographic data match, the processor 112 generates the validity signal VS at a logic high state to indicate that the ROM patch is a valid ROM patch. If the first and reference partial cryptographic data do not match, the processor 112 generates the validity signal VS at a logic low state to indicate that the ROM patch is an invalid ROM patch. The validity signal VS is then provided to the second register R2. For the sake of ongoing discussion, it is assumed that the ROM patch is a valid ROM patch. Further, as the ROM patch enable bit is at a logic high state, the processor 112 generates and provides the control and select signals CS and SS at logic high states to the first and third registers R1 and R3, respectively. The processor 112 executes the above-mentioned operations by executing the first set of ROM instructions. Further, as the control signal CS is at a logic high state upon the execution of the first set of ROM instructions, the comparator 114 is operational.

As the comparator 114 is operational, for each subsequent address generated by the processor 112 (i.e., addresses generated after the first set of addresses), the comparator 114 receives and compares the corresponding generated address with the ROM patch address. Further, as the validity and select signals VS and SS are at logic high states and based on the result of the comparison, the processor 112 receives the fourth set of ROM instructions or the set of patch instructions for execution.

When the processor 112 generates the second address that is associated with the erroneous ROM instructions, the second address is communicated to the ROM controller 104, the OTP memory controller 110, and the comparator 114. The ROM controller 104 is thus configured to receive the second address and retrieve the fourth set of ROM instructions associated with the second address (i.e., the second set of ROM instructions). The ROM controller 104 is further configured to provide the second set of ROM instructions to the first and second MUXs M1 and M2 (i.e., the first input terminals of the first and second MUXs M1 and M2). Further, the OTP memory controller 110 is configured to receive the second address and compare the second address with the ROM patch address. As the second address and the ROM patch address match, the OTP memory controller 110 is configured to retrieve the set of patch instructions from the OTP memory 108 and provide the set of patch instructions to the first MUX M1 (i.e., the second input terminal of the first MUX M1). Further, the comparator 114 is configured to receive the second address and compare the second address with the ROM patch address. The equality of the second address and the ROM patch address further enables the comparator 114 to generate the first intermediate signal INT1 at a logic high state. Further, as the ROM patch is a valid ROM patch (i.e., the validity signal VS is at a logic high state), the logic gate LG receives the first intermediate signal INT1 and the validity signal VS at logic high states, and hence, outputs the second intermediate signal INT2 at a logic high state.

The first MUX M1 receives the second intermediate signal INT2 at a logic high state as a select input, and hence, outputs the set of patch instructions as the first MUX output data MOD1. Further, as the select signal SS is at a logic high state, the second MUX M2 outputs and provides the set of patch instructions as the second MUX output data MOD2 to the processor 112 for execution. The processor 112 thus receives and executes the set of patch instructions instead of the second set of ROM instructions. The ROM patch thus fixes the bug identified in the second set of ROM instructions (i.e., the erroneous ROM instructions).

The processor 112 further generates the third address that is immediately subsequent to the second address. The third address is communicated to the ROM controller 104, the OTP memory controller 110, and the comparator 114. The ROM controller 104 is configured to receive the third address and retrieve the fourth set of ROM instructions associated with the third address (i.e., the third set of ROM instructions). Further, the OTP memory controller 110 is configured to receive the third address and compare the third address with the ROM patch address. As the third address and the ROM patch address do not match, the set of patch instructions is not retrieved from the OTP memory 108. Further, the comparator 114 is configured to receive the third address and compare the third address with the ROM patch address. As the third address and the ROM patch address do not match, the comparator 114 generates the first intermediate signal INT1 at a logic low state, and consequently, the logic gate LG outputs the second intermediate signal INT2 at a logic low state. The first MUX M1 thus outputs the third set of ROM instructions as the first MUX output data MOD1. Further, the logic high state of the select signal SS enables the second MUX M2 to output and provide the third set of ROM instructions as the second MUX output data MOD2 to the processor 112 for execution. The processor 112 thus receives and executes the third set of ROM instructions and resumes the execution of the ROM code.

It will be apparent to a person skilled in the art that the scope of the present disclosure is not limited to the ROM patch being a valid ROM patch. In various other embodiments, the ROM patch stored in the OTP memory 108 may be an invalid ROM patch (i.e., the ROM patch may include malicious instructions), without deviating from the scope of the present disclosure. In such a scenario, the validity signal VS is generated at a logic low state. As the validity signal VS is at a logic low state, the first and second intermediate signals INT1 and INT2 are at logic low states. Thus, when the second address is generated, the first and second MUXs M1 and M2 output the second set of ROM instructions retrieved by the ROM controller 104 as the first and second MUX output data MOD1 and MOD2, respectively. The processor 112 thus receives and executes the second set of ROM instructions.

Although FIG. 1 describes that the ROM patch is stored in the OTP memory 108 after the tape-out of the SoC 100 and prior to the deployment of the SoC 100 in the field, the scope of the present disclosure is not limited to it. In various other embodiments, the secure patching of the ROM code of the present disclosure ensures that the ROM patch may be stored in the OTP memory 108 after the device is deployed in the field, without deviating from the scope of the present disclosure.

It will be apparent to a person skilled in the art that the scope of the present disclosure is not limited to installation (i.e., storage) and subsequent execution of a single ROM patch. The OTP memory 108 of the SoC 100 may include a plurality of ROM patches for fixing a plurality of bugs in the ROM code, respectively. Each ROM patch may be similar to the ROM patch described above. In such a scenario, the SoC 100 may include a plurality of comparators that are similar to the comparator 114, a plurality of registers that are similar to the first through third registers R1-R3, a plurality of logic gates that are similar to the logic gate LG, and a plurality of MUXs that are similar to the first and second MUXs M1 and M2. Further, each ROM patch may be authenticated by the processor 112, and a corresponding validity signal (such as the validity signal VS) for each ROM patch may be generated and provided to the corresponding second register R2 during the execution of the first set of ROM instructions.

FIGS. 2A-2D, collectively, represent a flowchart 200 that illustrates a method for securely patching the ROM code in accordance with an embodiment of the present disclosure.

Figure 2A:
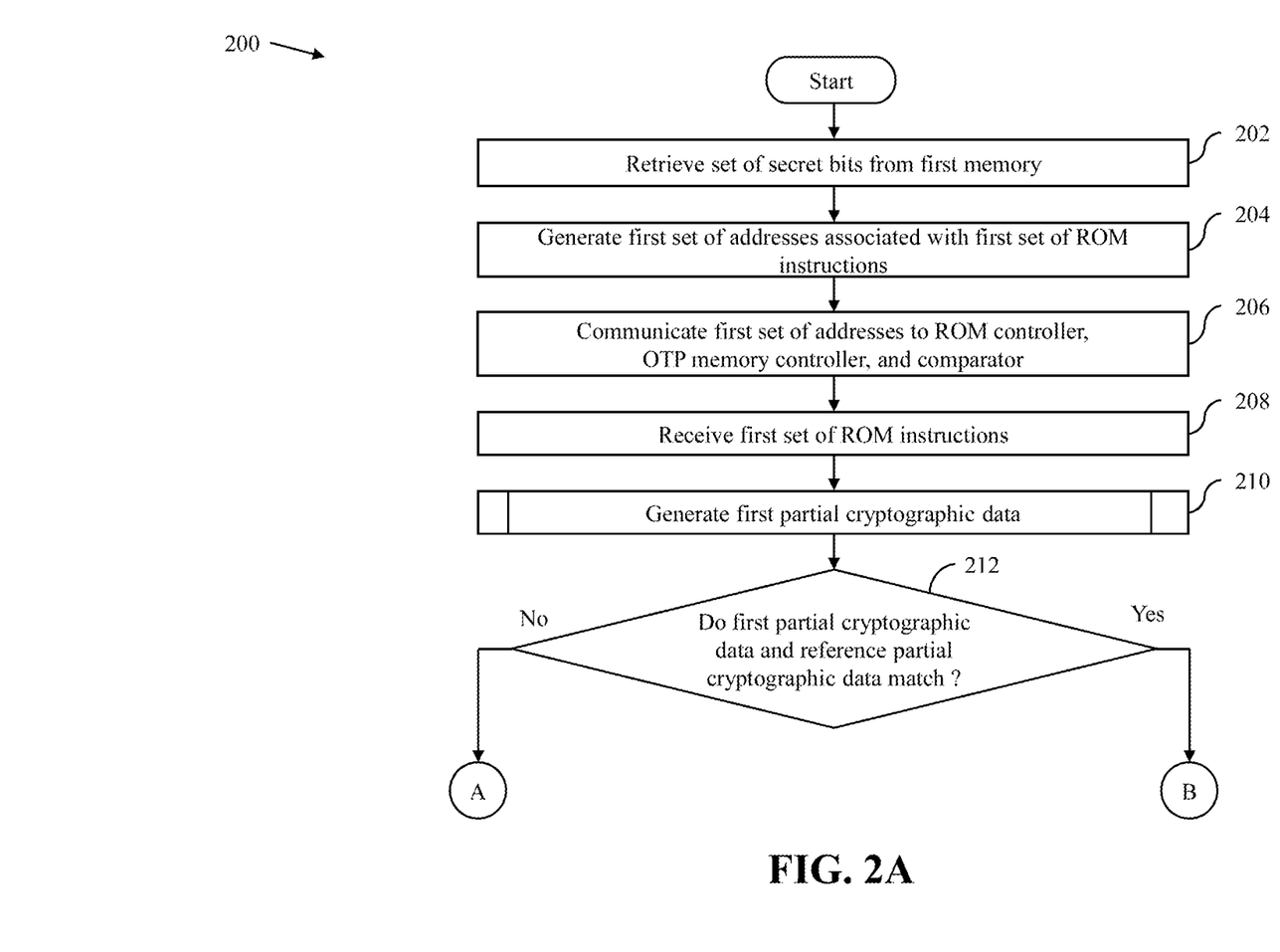
FIGS. 2A-2D, collectively, represent a flow chart that illustrates a method for securely patching the ROM code in accordance with an embodiment of the present disclosure.

Referring now to FIG. 2A, at step 202, the processor 112 retrieves the set of secret bits from the first memory 106. At step 204, the processor 112 generates the first set of addresses that is associated with the first set of ROM instructions. At step 206, the processor 112 communicates the first set of addresses to the ROM controller 104, the OTP memory controller 110, and the comparator 114. At step 208, the processor 112 receives the first set of ROM instructions. The first set of ROM instructions of the ROM code includes instructions to identify whether the ROM patch that is stored in the OTP memory 108 is active, and authenticate the active ROM patch. For the sake of ongoing discussion, it is assumed that the ROM patch is active. At step 210, the processor 112 generates the first partial cryptographic data based on the ROM patch and the set of secret bits for authenticating the ROM patch. The processor 112 generates the first partial cryptographic data by executing the first subset of ROM instructions.

Figure 2B:
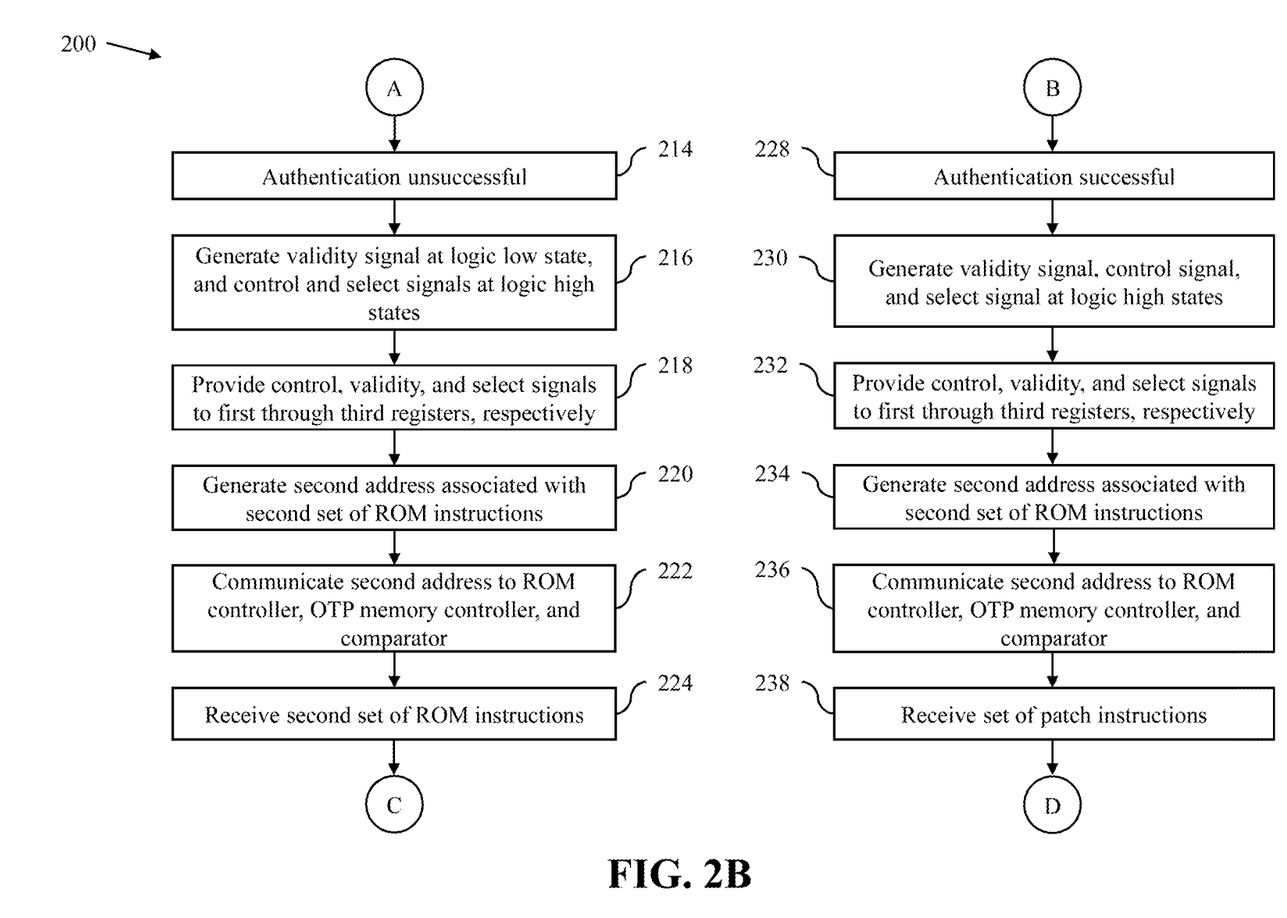
Figure 2C:
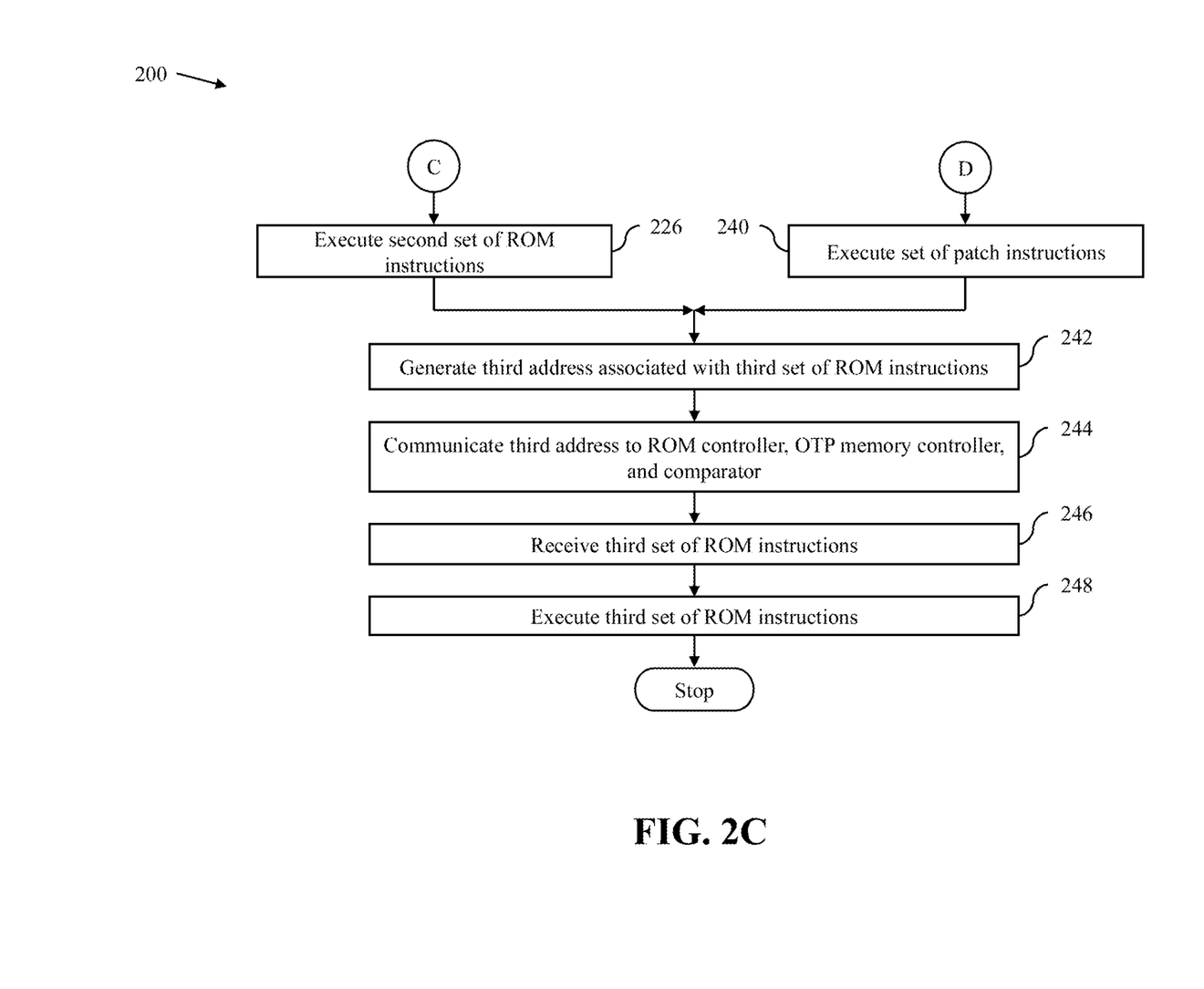
Figure 2D:
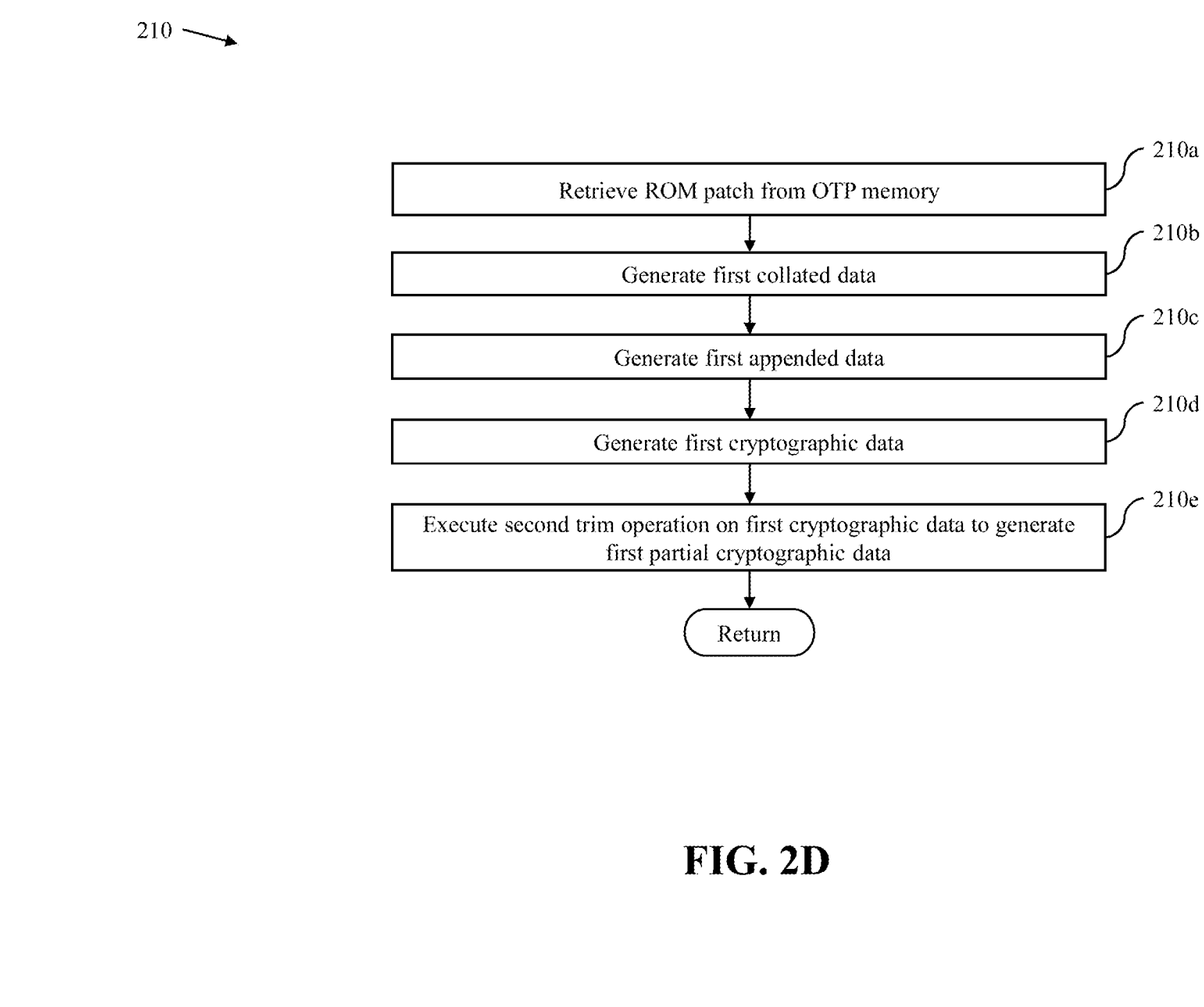

Referring now to FIG. 2D, at step 210a, the processor 112 retrieves the ROM patch from the OTP memory 108 by way of the OTP memory controller 110. At step 210b, the processor 112 generates the first collated data by collating the ROM patch enable bit, the set of address bits, and the set of data bits. At step 210c, the processor 112 generates the first appended data by appending the set of secret bits to the first collated data. At step 210d, the processor 112 generates the first cryptographic data by executing the second cryptographic operation on the first appended data. At step 210e, the processor 112 executes the second trim operation on the first cryptographic data to generate the first partial cryptographic data.

Referring back to FIG. 2A, at step 212, the processor 112 compares the first partial cryptographic data with the reference partial cryptographic data of the ROM patch to determine if the first partial cryptographic data matches the reference partial cryptographic data. If at step 212, it is determined that the first and reference partial cryptographic data do not match, step 214 is executed.

Referring now to FIG. 2B, at step 214, the processor 112 determines that the authentication of the ROM patch is unsuccessful (i.e., the ROM patch is an invalid ROM patch). The processor 112 executes steps 212 and 214 by executing the second subset of ROM instructions. At step 216, as the ROM patch is active (i.e., the ROM patch enable bit is at a logic high state) and the authentication of the ROM patch is unsuccessful, the processor 112 generates the control and select signals CS and SS at logic high states and the validity signal VS at a logic low state. The processor 112 generates the validity signal VS, the control signal CS, and the select signal SS by executing the third through fifth subsets of ROM instructions. At step 218, the processor 112 provides, by executing the sixth subset of ROM instructions, the control signal CS, the validity signal VS, and the select signal SS to the first through third registers R1-R3, respectively.

At step 220, the processor 112 generates the second address that is associated with the second set of ROM instructions. At step 222, the processor 112 communicates the second address to the ROM controller 104, the OTP memory controller 110, and the comparator 114. Although the second address matches the ROM patch address, at step 224, the processor 112 receives the second set of ROM instructions as the validity signal VS is at a logic low state. Referring now to FIG. 2C, at step 226, the processor 112 executes the second set of ROM instructions.

Referring back to FIG. 2A, if at step 212, it is determined that the first and reference partial cryptographic data match, step 228 is executed. Referring back to FIG. 2B, at step 228, the processor 112 determines that the authentication of the ROM patch is successful (i.e., the ROM patch is a valid ROM patch). The processor 112 executes steps 212 and 228 by executing the second subset of ROM instructions. At step 230, as the ROM patch is active and the authentication of the ROM patch is successful, the processor 112 generates the validity signal VS, the control signal CS, and the select signal SS at logic high states. The processor 112 generates the validity signal VS, the control signal CS, and the select signal SS by executing the third through fifth subsets of ROM instructions, respectively. At step 232, the processor 112 provides, by executing the sixth subset of ROM instructions, the control signal CS, the validity signal VS, and the select signal SS to the first through third registers R1-R3, respectively.

At step 234, the processor 112 generates the second address that is associated with the second set of ROM instructions. At step 236, the processor 112 communicates the second address to the ROM controller 104, the OTP memory controller 110, and the comparator 114. As the second address matches the ROM patch address and the validity signal VS is at a logic high state, at step 238, the processor 112 receives the set of patch instructions. Referring back to FIG. 2C, at step 240, the processor 112 executes the set of patch instructions. As the set of patch instructions is executed instead of the erroneous ROM instructions (i.e., the second set of instructions), the ROM code is thus securely patched with the ROM patch.

At step 242, the processor 112 generates the third address that is associated with the third set of ROM instructions. At step 244, the processor 112 communicates the third address to the ROM controller 104, the OTP memory controller 110, and the comparator 114. As the third address and the ROM patch address do not match, at step 246, the processor 112 receives the third set of ROM instructions. At step 248, the processor 112 executes the third set of ROM instructions to resume the execution of the ROM code.

Thus, the ROM code is securely patched with the set of patch instructions of the ROM patch. The authentication of the ROM patch prior to the patching of the ROM code ensures that the ROM patch is a valid ROM patch (i.e., the ROM patch does not include malicious instructions). Thus, the execution of the set of patch instructions does not compromise the security of the SoC 100 and the device in which the SoC 100 is included. Further, if a bug is identified in the ROM code after the device is deployed in the field, the secure patching of the ROM code enables storage of the corresponding ROM patch in the OTP memory 108 while the device is in the field for fixing the identified bug. This eliminates the need to replace the device having erroneous ROM instructions, which in turn leads to a low cost of manufacturing of the device. Further, as the bug is fixed with over-the-air storage of ROM patches (i.e., the storage of the ROM patches once the device is deployed in the field), the device including the SoC 100 of the present disclosure operates more efficiently as compared to devices in which conventional ROM code patching techniques are implemented. The ROM code patching technique of the present disclosure is thus more secure as compared to the conventional ROM code patching techniques.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

The invention claimed is:

1. A system for securely patching a read-only-memory (ROM) code, the system comprising:
a processor configured to:
generate first partial cryptographic data based on a ROM patch and a set of secret bits, wherein the ROM patch includes a set of address bits, a set of reference bits, and a set of data bits that are indicative of a ROM patch address, reference partial cryptographic data, and a set of patch instructions, respectively;
authenticate the ROM patch based on a match between the first partial cryptographic data and the reference partial cryptographic data;
generate, upon the authentication of the ROM patch, a first address that is associated with a first set of ROM instructions of a plurality of ROM instructions of the ROM code; and
execute the set of patch instructions of the ROM patch that is successfully authenticated instead of the first set of ROM instructions when the first address matches the ROM patch address, thereby securely patching the ROM code.

2. The system of claim 1, further comprising:
a ROM that is configured to store the ROM code;
a first memory that is configured to store the set of secret bits; and
a one-time programmable (OTP) memory that is configured to store the ROM patch, wherein the ROM patch further includes a ROM patch enable bit.

3. The system of claim 2, wherein the reference partial cryptographic data is generated based on the ROM patch enable bit, the set of address bits, the set of data bits, and the set of secret bits.

4. The system of claim 2, wherein the processor is coupled with the first memory, and is further configured to retrieve the set of secret bits from the first memory.

5. The system of claim 2, wherein the processor is coupled with the OTP memory, and
wherein to generate the first partial cryptographic data, the processor is further configured to:
retrieve the ROM patch from the OTP memory;
generate first collated data by collating the ROM patch enable bit, the set of address bits, and the set of data bits;
generate first appended data by appending the set of secret bits to the first collated data;
generate first cryptographic data by executing a cryptographic operation on the first appended data; and
execute a trim operation on the first cryptographic data to generate the first partial cryptographic data.

6. The system of claim 2, wherein the processor is further configured to generate a second set of addresses that is associated with a second set of ROM instructions of the plurality of ROM instructions, and wherein the processor generates the first partial cryptographic data and authenticates the ROM patch by executing first and second subsets of ROM instructions of the second set of ROM instructions, respectively.

7. The system of claim 6, wherein the processor is further configured to:
generate, upon the execution of the set of patch instructions, a third address that is associated with a third set of ROM instructions of the plurality of ROM instructions; and
execute the third set of ROM instructions to resume the execution of the ROM code.

8. The system of claim 7, further comprising a ROM controller that is coupled with the processor and the ROM, and is configured to:
receive the first address, the second set of addresses, and the third address generated by the processor; and
retrieve, from the ROM based on each received address, a fourth set of ROM instructions of the plurality of ROM instructions, wherein at least one of the first, second, and third sets of ROM instructions include the fourth set of ROM instructions retrieved from the ROM.

9. The system of claim 8, further comprising an OTP memory controller that is coupled with the processor and the OTP memory, and is configured to:
receive the first address, the second set of addresses, and the third address generated by the processor;
compare each received address with the ROM patch address; and
retrieve the set of patch instructions from the OTP memory based on a result of the comparison.

10. The system of claim 9, further comprising a first multiplexer that has:
a first input terminal that is coupled with the ROM controller, and is configured to receive the fourth set of ROM instructions;
a second input terminal that is coupled with the OTP memory controller, and is configured to receive the set of patch instructions;
a select terminal that is configured to receive a first intermediate signal; and
an output terminal that is configured to output first multiplexer output data, wherein when the first intermediate signal is at logic low and logic high states, the first multiplexer outputs the fourth set of ROM instructions and the set of patch instructions as the first multiplexer output data, respectively.

11. The system of claim 10, further comprising a logic gate having a first input terminal that is configured to receive a second intermediate signal, a second input terminal that is configured to receive a validity signal, and an output terminal that is configured to output the first intermediate signal.

12. The system of claim 11, wherein the processor is further configured to generate the validity signal based on the authentication of the ROM patch, and wherein the processor generates the validity signal by executing a third subset of ROM instructions of the second set of ROM instructions.

13. The system of claim 11, further comprising a comparator that is coupled with the processor and the OTP memory controller, and is configured to:
- receive the ROM patch address;
- receive the first address and the third address from the processor; and
- compare each address received from the processor with the ROM patch address to generate the second intermediate signal.

14. The system of claim 10, further comprising a second multiplexer that has:
- a first input terminal that is coupled with the ROM controller, and is configured to receive the fourth set of ROM instructions;
- a second input terminal that is coupled with the output terminal of the first multiplexer, and is configured to receive the first multiplexer output data;
- a select terminal that is configured to receive a select signal; and
- an output terminal that is coupled with the processor, and is configured to output and provide second multiplexer output data to the processor, wherein when the select signal is at logic low and logic high states, the second multiplexer outputs the fourth set of ROM instructions and the first multiplexer output data as the second multiplexer output data, respectively.

15. The system of claim 14, wherein the processor is further configured to generate the select signal based on the ROM patch enable bit, and wherein the processor generates the select signal by executing a fourth subset of ROM instructions of the second set of ROM instructions.

16. A method for securely patching a read-only-memory (ROM) code stored in a ROM of a system-on-chip (SoC) by a processor of the SoC, the method comprising:
- generating first partial cryptographic data based on a ROM patch and a set of secret bits, wherein the ROM patch includes a set of address bits, a set of reference bits, and a set of data bits that are indicative of a ROM patch address, reference partial cryptographic data, and a set of patch instructions, respectively;
- authenticating the ROM patch based on a match between the first partial cryptographic data and the reference partial cryptographic data;
- generating, upon the authentication of the ROM patch, a first address that is associated with a first set of ROM instructions of a plurality of ROM instructions of the ROM code; and
- executing the set of patch instructions of the ROM patch that is successfully authenticated instead of the first set of ROM instructions when the first address matches the ROM patch address, thereby securely patching the ROM code.

17. The method of claim 16, wherein the ROM patch further includes a ROM patch enable bit, and wherein the step of generating the first partial cryptographic data further comprises:
- retrieving the ROM patch from a one-time programmable memory of the SoC;
- generating first collated data by collating the ROM patch enable bit, the set of address bits, and the set of data bits;
- generating first appended data by appending the set of secret bits to the first collated data;
- generating first cryptographic data by executing a cryptographic operation on the first appended data; and
- executing a trim operation on the first cryptographic data to generate the first partial cryptographic data.

18. The method of claim 16, further comprising generating a second set of addresses that is associated with a second set of ROM instructions of the plurality of ROM instructions, wherein the first partial cryptographic data is generated and the ROM patch is authenticated by executing first and second subsets of ROM instructions of the second set of ROM instructions, respectively.

19. The method of claim 16, further comprising:
- generating, upon the execution of the set of patch instructions, a third address that is associated with a third set of ROM instructions of the plurality of ROM instructions; and
- executing the third set of ROM instructions to resume the execution of the ROM code.

20. The method of claim 16, wherein the ROM patch further includes a ROM patch enable bit, and wherein the reference partial cryptographic data is generated based on the ROM patch enable bit, the set of address bits, the set of data bits, and the set of secret bits.

* * * * *